(12) United States Patent
Schlossnagle

(10) Patent No.: US 10,282,874 B2
(45) Date of Patent: May 7, 2019

(54) EFFICIENT TIME-SERIES HISTOGRAMS

(71) Applicant: CIRCONUS, INC., Fulton, MD (US)

(72) Inventor: Theo Ezell Schlossnagle, Fulton, MD (US)

(73) Assignee: CIRCONUS, INC., Fulton, MD (US)

(*) Notice: Subject to any disclaimer, the term of this patent is extended or adjusted under 35 U.S.C. 154(b) by 0 days.

(21) Appl. No.: 14/488,867

(22) Filed: Sep. 17, 2014

(65) Prior Publication Data

US 2016/0078654 A1    Mar. 17, 2016

(51) Int. Cl.
| | | |
|---|---|---|
| *G06T 11/20* | (2006.01) | |
| *G06T 1/20* | (2006.01) | |
| *G06K 9/46* | (2006.01) | |
| *G06K 9/52* | (2006.01) | |
| *G06F 16/2458* | (2019.01) | |
| *G06F 16/28* | (2019.01) | |

(52) U.S. Cl.
CPC ........ *G06T 11/206* (2013.01); *G06F 16/2477* (2019.01); *G06F 16/285* (2019.01); *G06K 9/4642* (2013.01)

(58) Field of Classification Search
CPC .............. G06F 17/18; G06F 17/30469; G06F 11/3452; G06F 12/0802; G06F 17/30536; G06T 11/206; G06T 5/40
USPC .......................... 382/168; 345/581; 702/180
See application file for complete search history.

(56) References Cited

U.S. PATENT DOCUMENTS

| | | | |
|---|---|---|---|
| 5,613,105 A | 3/1997 | Zbikowski et al. | |
| 5,960,435 A | 9/1999 | Rathmann et al. | |
| 6,477,523 B1 | 11/2002 | Chiang | |
| 6,744,923 B1* | 6/2004 | Zabih | G06K 9/20 382/154 |
| 7,219,034 B2* | 5/2007 | McGee | G06F 11/323 348/672 |
| 7,660,461 B2 | 2/2010 | Lundstrom et al. | |
| 7,826,663 B2 | 11/2010 | Ramsey et al. | |
| 7,936,930 B2 | 5/2011 | Lundstrom et al. | |
| 8,189,912 B2 | 5/2012 | Piper | |
| 8,316,009 B2 | 11/2012 | Fraser et al. | |
| 8,390,626 B2 | 3/2013 | Helfman et al. | |
| 8,433,702 B1 | 4/2013 | Carrino et al. | |
| 8,458,547 B2 | 6/2013 | Viswanathan et al. | |
| 8,653,993 B2 | 2/2014 | Bendel et al. | |
| 9,697,316 B1* | 7/2017 | Taylor | G06F 17/5068 |
| 2003/0088542 A1* | 5/2003 | McGee | G06F 11/323 |

(Continued)

OTHER PUBLICATIONS

Sigworth et al., "Data Transformations for Improved Display and Fitting of Single-Channel Dwell Time Histograms", Biophysics Journal, vol. 52, Dec. 1987, p. 1047-1054.*

(Continued)

*Primary Examiner* — Jin Cheng Wang (74) *Attorney, Agent, or Firm* — Medler Ferro Woodhouse & Mills PLLC (57) ABSTRACT

A method for constructing histograms may include receiving a set of data values, wherein the data values are two-dimensional or three-dimensional and the data values contain at least one measurement over time; creating a plurality of bins in memory, wherein the plurality of bins are log-linear bins using two significant digits base 10; creating a zero bin representing the number 0; placing non-zero numbers of the set of data values into the plurality of bins; and generating one or more histograms using the bins.

16 Claims, 8 Drawing Sheets

(56) References Cited

U.S. PATENT DOCUMENTS

| | | | |
|---|---|---|---|
| 2004/0260517 A1 | 12/2004 | Ding et al. | |
| 2006/0129529 A1* | 6/2006 | Adler | G06F 17/30592 |
| 2006/0176479 A1* | 8/2006 | Laurence | G01J 1/42 |
| | | | 356/317 |
| 2006/0208754 A1* | 9/2006 | Takeuchi | G01R 31/2858 |
| | | | 702/117 |
| 2008/0027774 A1 | 1/2008 | Jameson | |
| 2009/0106183 A1* | 4/2009 | Estan | H04L 69/22 |
| | | | 706/48 |
| 2009/0284265 A1* | 11/2009 | Ohta | H02H 1/0015 |
| | | | 324/536 |
| 2009/0327913 A1* | 12/2009 | Adar | G06F 17/30876 |
| | | | 715/745 |
| 2009/0327914 A1* | 12/2009 | Adar | G06F 17/3089 |
| | | | 715/745 |
| 2010/0169247 A1* | 7/2010 | Srebranig | G06F 17/18 |
| | | | 706/12 |
| 2010/0218078 A1* | 8/2010 | Channon | G06F 17/30061 |
| | | | 715/205 |
| 2011/0063479 A1 | 3/2011 | Bito et al. | |
| 2011/0257732 A1* | 10/2011 | McClain | A61F 2/82 |
| | | | 623/1.46 |
| 2013/0038605 A1 | 2/2013 | Li et al. | |
| 2013/0061101 A1* | 3/2013 | Fitzpatrick | G11C 29/50004 |
| | | | 714/718 |
| 2013/0064815 A1* | 3/2013 | Cotler | A61K 45/06 |
| | | | 424/133.1 |
| 2013/0304396 A1* | 11/2013 | Walston | G01V 5/0091 |
| | | | 702/30 |
| 2013/0318305 A1 | 11/2013 | Bivens et al. | |
| 2014/0280880 A1* | 9/2014 | Tellis | H04L 41/5009 |
| | | | 709/224 |
| 2015/0046862 A1* | 2/2015 | Hansen | G06F 17/18 |
| | | | 715/771 |
| 2015/0154523 A1* | 6/2015 | Oobayashi | A61B 5/16 |
| | | | 705/7.38 |
| 2016/0371363 A1* | 12/2016 | Muro | G01D 9/28 |

OTHER PUBLICATIONS

PCT International Search Report and Written Opinion dated Dec. 18, 2015 in corresponding application PCT/US2015/50677.

Fuchs et al., "Compressed Histograms With Arbitrary Bucket Layouts for Selectivity Estimation," Information Science 177 (2007) 680-702.

Gandhi et al., "Space-Efficient Online Approximation of Time Series Data: Streams, Amnesia, and Out-of-Order," www.bibsonomy.org/bibtex/29f7c8f067c4491c1efd8469139e5a627/dblp, 2010.

Schlossnagle, Theo "What's in a number," available at https://www.slideshare.net/postwait/whats-in-a-number?from_action=save (published Sep. 19, 2011).

Cantrill, Bryan "agghist, aggzoom and aggpack," available at http://dtrace.org/blogs/bmc/2013/11/10/agghist-aggzoom-and-aggpack/ (published Nov. 10, 2013).

\* cited by examiner

EFFICIENT TIME-SERIES HISTOGRAMS

FIELD OF INVENTION

The present invention relates to efficient storing and displaying of time-series histogram data.

BACKGROUND OF THE INVENTION

A histogram is a graphical representation of data samples. In conventional settings, however, storing and retrieving time-series histograms may be inefficient. For example, when current systems retrieve time-series histograms, the histogram information stored in the system will often exceed the visual space needed to visualize the data. The data may exceed visual space over the time (x) axis, over the bin (y) axis, or both. Accordingly, efficient techniques are needed for storing and retrieving time-series histogram data.

SUMMARY

Embodiments of the invention may include a system, method, and/or computer-readable medium. In one embodiment, a method may exist for constructing histograms may comprise: receiving, by one or more processors, a set of data values, wherein the data values are two-dimensional or three-dimensional and the data values contain at least one measurement over time; creating, by the one or more processors, a plurality of bins in memory, wherein the plurality of bins are log-linear bins using two significant digits base 10; creating, by the one or more processors, a zero bin representing the number 0; placing, by the one or more processors, non-zero numbers of the set of data values into the plurality of bins; and generating, by the one or more processors, one or more histograms using the bins.

In another embodiment, a non-transitory computer-readable medium may exist comprising instructions, which when executed by one or more processors causes the one or more processors to perform operations for constructing histograms, the computer-readable medium comprising instructions to: receive a set of data values, wherein the data values are two-dimensional or three-dimensional and the data values contain at least one measurement over time; create a plurality of bins in memory, wherein the plurality of bins are log-linear bins using two significant digits base 10; create a zero bin representing the number 0; place non-zero numbers of the set of data values into the plurality of bins; and generate one or more histograms using the bins.

In yet another embodiment, a system for constructing histograms may exist comprising: one or more processors for executing a plurality of instructions; a display device in communication with the one or more processors; and a storage device in communication with the one or more processors, the storage device holding the plurality of instructions, the plurality of instructions including instructions to: receive a set of data values, wherein the data values are two-dimensional or three-dimensional and the data values contain at least one measurement over time; create a plurality of bins in memory, wherein the plurality of bins are log-linear bins using two significant digits base 10; create a zero bin representing the number 0; place non-zero numbers of the set of data values into the plurality of bins; generate one or more histograms using the bins; and display the one or more histograms via the display device.

BRIEF DESCRIPTION OF THE DRAWINGS

The foregoing and other features and advantages of the invention will be apparent from the following, more particular description of various embodiments, as illustrated in the accompanying drawings wherein like reference numbers generally indicate identical, functionally similar, and/or structurally similar elements. The first digits in the reference number indicate the drawing in which an element first appears. Unless otherwise indicated, the accompanying drawing figures are not to scale.

DETAILED DESCRIPTION

Illustrative embodiments are discussed in detail below. While specific embodiments are discussed, it should be understood that this is done for illustration purposes only. In describing and illustrating the embodiments, specific terminology is employed for the sake of clarity. However, the embodiments are not intended to be limited to the specific terminology so selected. A person skilled in the relevant art will recognize that other components and configurations may be used without departing from the spirit and scope of the embodiments. It is to be understood that each specific element includes all technical equivalents that operate in a similar manner to accomplish a similar purpose. The examples and embodiments described herein are non-limiting examples.

Furthermore, the embodiments detailed below may be combined into a new embodiment and/or various features of the embodiments described below may be combined to form a new embodiment.

All publications cited herein are hereby incorporated by reference in their entirety. As used herein, the term "a" refers to one or more. The terms "including," "for example," "such as," "e.g.," "may be" and the like, are meant to include, but not be limited to, the listed examples.

Figure 1:
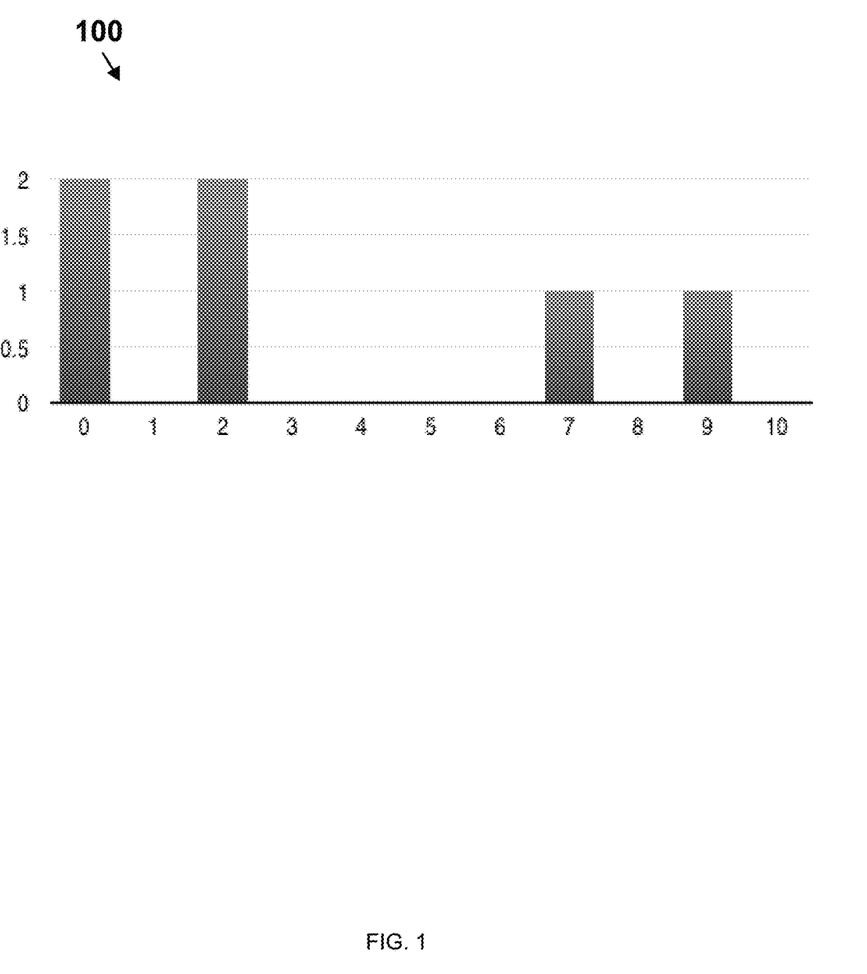
FIG. 1 depicts a sample histogram of eleven units.

FIG. 1 depicts a sample histogram of eleven units or bins. A histogram is a dense representation of data samples where samples themselves may be grouped together (losing accuracy). For example, given a set of numbers 0.5, 0.7, 2.0, 2.9, 7 and 9.2, one may divide the space from 0 to 10 into units of 1. The histogram of FIG. 1 depicts 11 "bins" of size 1: [0,1), [1,2), [2,3), [3,4), [4,5), [5,6), [6,7), [7,8), [8,9), and [9,10). The number and size of the bins may change. There are two numbers in each of [0,1) and [2,3), and one number in each of [7,8) and [9,10) as shown in FIG. 1.

Figure 2:
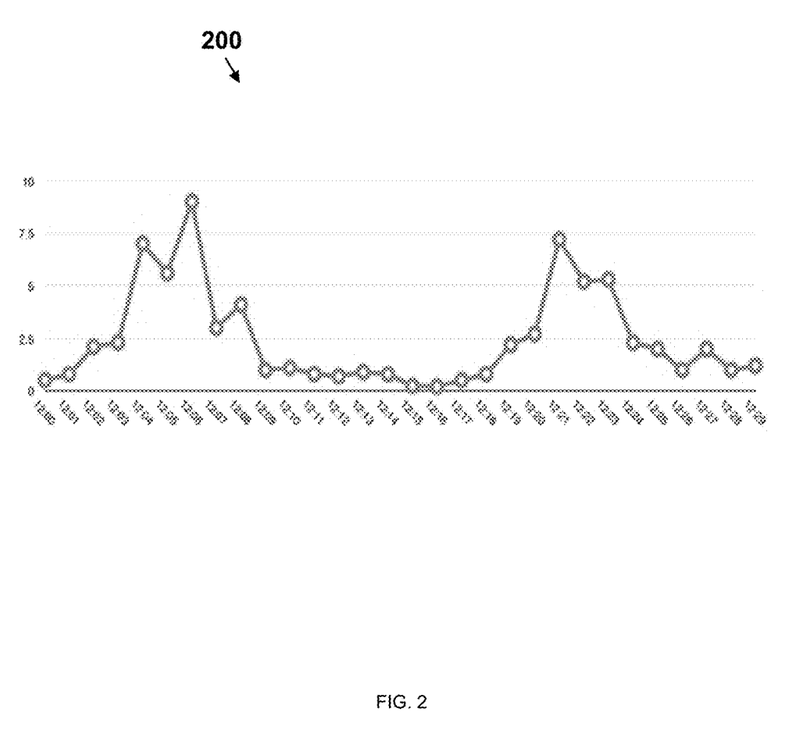
FIG. 2 depicts a sample time-series, with the measurement value on the y-axis and a time of measurement on the x-axis.

FIG. 2 depicts a sample time-series, with a measurement on the y-axis and a time the measurement was taken on the x-axis. A time series is a set of measurements over time. In this example, it is measured how long a specific action took (e.g. loading a web page) every minute for 30 minutes. A common visual representation (line graph) would be to place the measurement on the y-axis and the time on the x-axis as shown in FIG. 2.

Histograms may also display three dimensions of data in a two dimensional view. For example, time may be the x-axis, a measurement value may be the y-axis, and a third dimensions may be represented using color density.

Figure 3A:
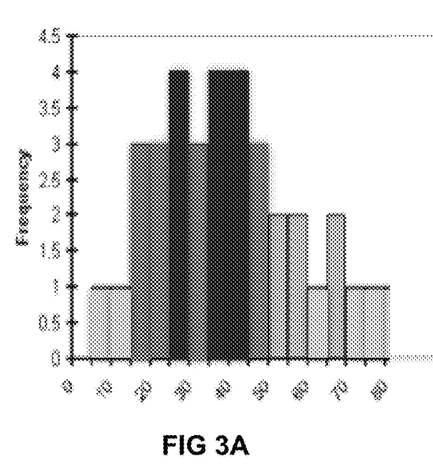
FIG. 3A-3D depict histograms using color density.

FIG. 3A depicts a histogram using color density to represent values. There are eighteen bins along the axis. The frequency the values appear in the bins is along with y-axis. Large populations in a given bin result in a more dense (e.g., darker) color representation.

Figure 3B:
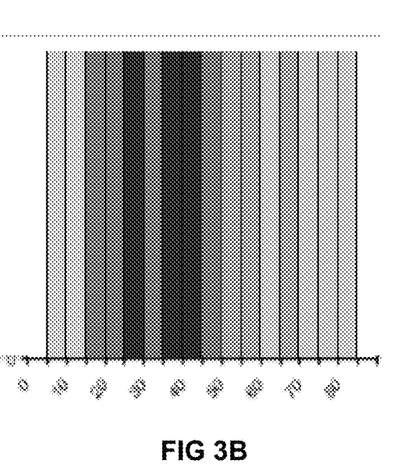

FIG. 3B depicts another histogram using color density to represent values. FIG. 3B depicts an example of a histogram using color density to represent values without using bar height. Thus, the frequency is removed from the y-axis. Population can be understood based on color density without explicit bar height.

Figure 3C:
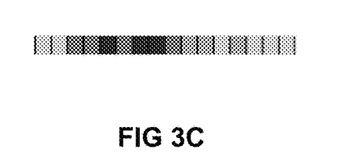

FIG. 3C depicts the histogram of FIG. 3B where height is reduced to compress space.

Figure 3D:
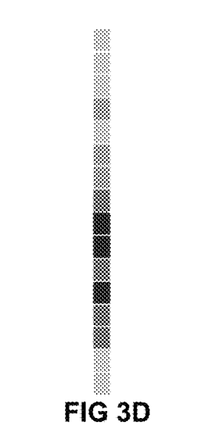

FIG. 3D depicts the reduced height histogram of FIG. 3C rotated counter-clockwise 90 degrees as a "vertical histogram."

Figure 4:
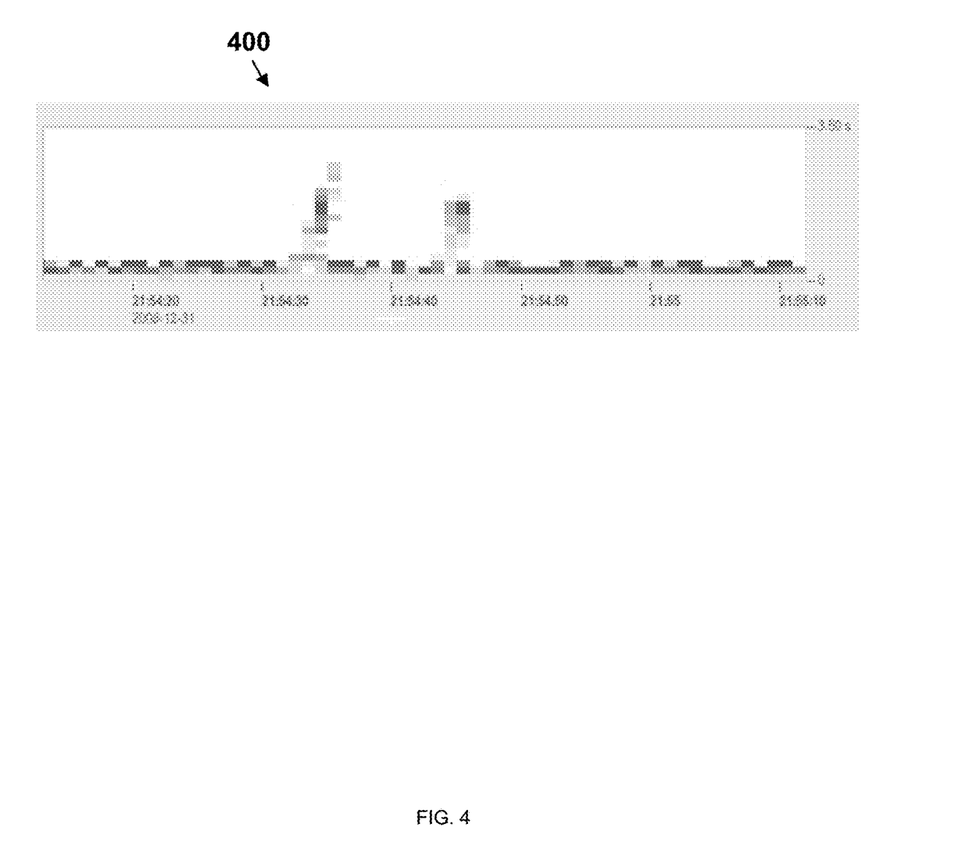
FIG. 4 depicts side-by-side vertical histograms representing measurements over time.

FIG. 4 depicts side-by-side vertical histograms representing measurements over time. For example, once the vertical color-density transformation of FIGS. 3A-3D is applied to a histogram, many vertical histograms over time may be represented by placing them side-by-side and a large amount of data may be visually displayed in a limited space. This may be one technique to visually display a large amount of data in a limited space.

In conventional settings, storing and retrieving (e.g., for visualization) time-series histograms may be inefficient. For example, when retrieving time-series histograms the histogram information stored in the system often exceeds the visual space available to visualize the data. The data may exceed the visual space over the time (x) axis or it may exceed the visual space over the bin (y) axis, or both.

For example, if histograms are stored on a one minute basis, over a two year period more than one million histograms will be stored. In a limited visual space, such as a computer monitor or other display, where only some small number of time-series histograms can be displayed, aggregation of the one-minute histograms into a larger time interval for visualization may be required. Assuming, for example, the visual space can display 1,500 vertical histograms. Then, groups of 720 one-minute histograms may be aggregated into a single 12-hour-histogram. The number of 12-hour-histograms over 2 years is approximately 1,460 which may fit within the designated visual space. Accordingly, some of the data is not required for visualization and transmitting and reducing histograms that cannot be discerned when visualized is inefficient.

In another example, a data set may have measurements that are very small and very big such that differentiating small values in a visualization is not possible (e.g., measurements 1,000,000, 900,000, 0.1, and 0.13). Given limited visual space, a linear representation of values, 0.1 and 0.13 may be represented too close visually to be discerned. Accordingly, the difference between the 0.1 and 0.13 values may be indistinguishable as opposed to the difference between 1,000,000 and 900,000. Transmitting bins uniquely that cannot be discerned when visualized may be inefficient.

Time-Realm Efficiency

Previously, data being collected was analyzed to optimize for error reduction and clean visualization of a single histogram and not a series of histograms over time. Accordingly, previous approaches lacked a consistent approach to binning Consistency in binning was not required as histograms were not aggregated into larger time units.

However, in one embodiment, time-realm efficiency may be achieved. Bin selection may be the same to allow, for example, aggregating two histograms. Accordingly, bin measurements may maintain (1) a fixed size bin description, (2) a universal compatibility regardless of measurement magnitude while maintaining a satisfactory and useful level of precision, and (3) an ability to aggregate while controlling bin space.

A fixed size bin description may be accomplished by sizing the bin [begin, end) into a fixed bit-width (e.g., 16 bits) representation. The fixed-bit width may, for example, allow for more efficient key lookup. The bin size may be fixed (e.g., two significant digits base 10) regardless of the data values. This creates a uniform bin scheme that may be used, for example, across different data streams and keeps the same key space. In one embodiment, a fixed keyspace may be provided. The fixed keyspace is above and beyond fixed bins and may be a limitation to the number of total bins. The fixed key space may represent buckets between $1.0 \times 10^{-127}$ and $9.9 \times 10^{128}$, 0, and between $-1.0 \times 10^{-127}$ and $-9.9 \times 10^{128}$ and thereby limits the keys represent into 16 bits.

The fixed keyspace allows for aggregating, for example, the 720 one-minute histograms into a single 12-hour histogram both (1) efficiently and (2) in a fashion that tracks error consistently. Histogram may be aggregated more efficiently because the keyspaces between the histograms are identical. For example, two histograms may be simply be added together (e.g., bin by bin). If the keyspaces were different, mathematical conversions would be required and the effects on error would be even more complicated. Additionally, the uniform binning across various data streams also provides for highly compressible histograms. For example, restricted use of keyspace leads to better compression.

Combining histograms with different bin selections may be an issue because different bin selections that overlap but are not equal have different error introduced when samples are placed within them. Previously, when a new aggregate bin was created, a technique to re-bin the samples using some selected distribution assumption must be performed. The technique may not be possible if the bins are either really large (e.g., not useful) or they are small but samples can be entirely misplaced (e.g., the possible error would exceed the bin itself).

In one embodiment, universal compatibility regardless of measurement magnitude while maintaining a satisfactory and useful level of precision may be accomplished through the following. First, the number zero may be treated as an exact bin (e.g., all measurements that equal zero). A bin zero may be defined as containing all measurements that share equality with the value zero. Non-zero numbers may be represented in bins that are bounded numbers with two significant digits in base ten. This has characteristics of representing numbers of wide magnitude space (i.e., $10^{-128}$ to $10^{127}$) logarithmically, while maintaining a linear granularity within each bin set aiding human understanding and visualization (e.g., a large set of bins such as, [1.0, 1.1), [1.1, 1.2), . . . [9.9,10) collectively times $10^n$). Bins may be log-linear bins using two significant digits base 10, and, therefore, the maximal error is 5% and the average error is approximately 0.65%. As the base or significant digits changes, the error would change as well.

Bins may be from one point on a discrete number line to the next, with a closed interval on the point closest to zero and an open interval on the number furthest from zero (e.g. [1.7,1.8) and [−3400,−3500) and [$8.2 \times 10^{14}$, $8.3 \times 10^{14}$)). When two bins touch (e.g., two adjacent bins), for example,

[1.0,1.1) and [1.1,1.2) the bins cannot both represent 1.1 (e.g., no overlap). If both bins were closed, both would represent the point where they touch. If both bins were open, neither would represent the point where they touch. Accordingly, one bin must be open and one bin must be closed. A convention is needed to determine which bin the value of 1.1 would go into. So, closed-interval includes the point, open does not. Accordingly, in one embodiment, the point closest to zero is closed. In Mathsquare, for example, brackets [ ] indicate closed (including) and parenthesis ( ) indicate open (excluding).

Figure 5:
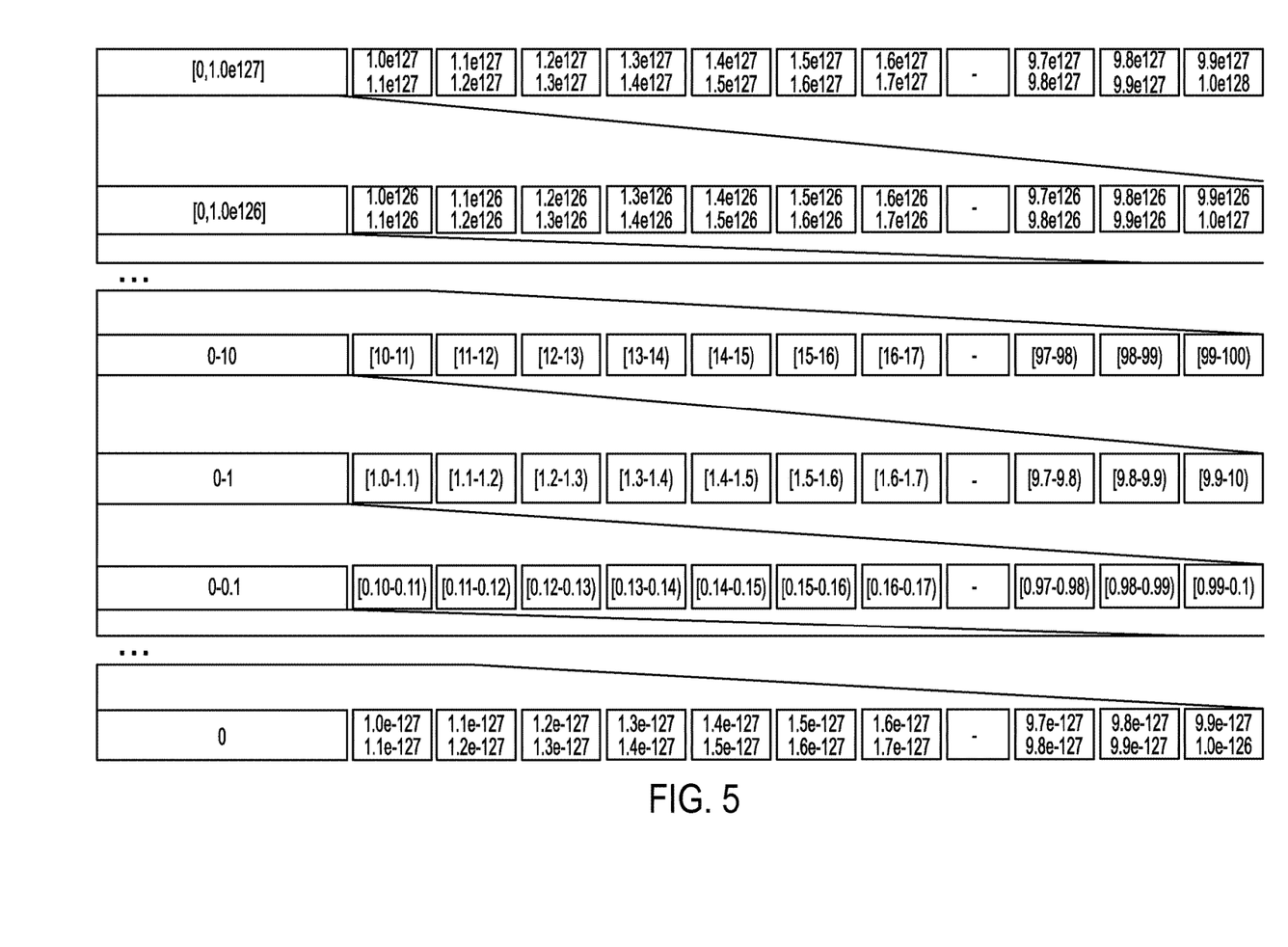
FIG. 5 depicts example fixed bin sizes.

FIG. 5 depicts a bin selection using two significant digits in base 10 and illustrates how the bottom 10% of each exponent range is actually represented by the adjacent smaller exponent. Additionally, the last exponent bin range in the figure depicts 0 as a special value wherein smaller measurements cannot be accounted for. This is a log-linear bin selection from $1.9 \times 10^{-127}$ to $9.9 \times 10^{128}$.

Figure 6:
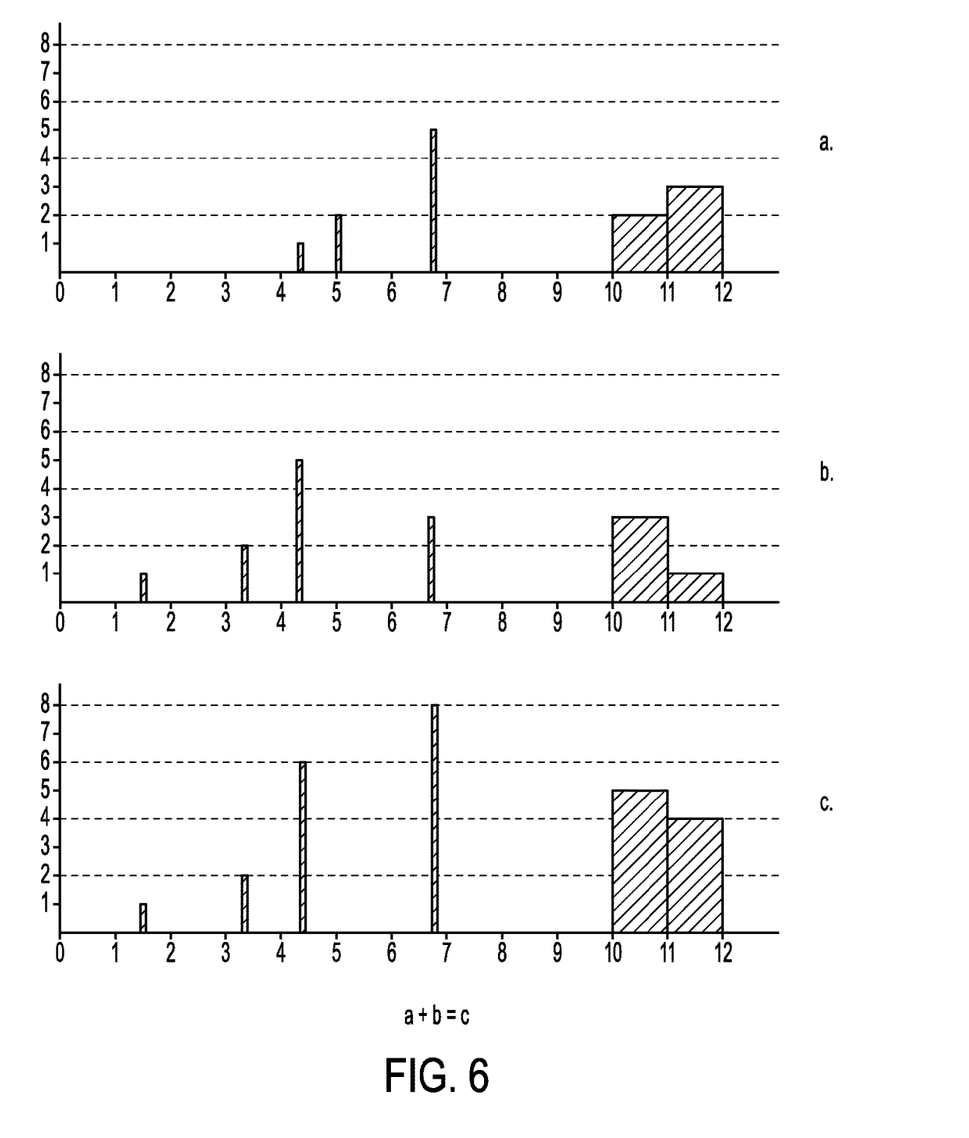
FIG. 6 depicts an example of multiple bin aggregation.

Given discrete representation, selected histograms may be aggregated without arbitrarily expanding the bin space, which may provide an ability to aggregate (e.g., via addition and subtraction) while controlling bin space. This may have the distinct real-world advantage of a highly controlled bin space for a physical system (e.g., a system having prescribed constraints). FIG. 6 depicts an example of multiple bin aggregation. For example, histograms in (a) added with histograms in (b) equals the histograms in (c).

Techniques shown below calculate and store (e.g., time) aggregated histogram data to decrease required information access on retrieval.

In one embodiment, the display may communicate the number of histograms desired and the storage system may dynamically aggregate requested data into lengthier periods of time. For example, displaying a two-year histogram time series where all histograms are stored by minute would require 1,051,200 histograms returned to the visualization system. Instead, for example, the display may request 1,000 histograms, which may result in the storage systems combining 720 one-minute histograms inclusively between [00:00 and 11:59] into one 12-hour histogram and the 720 one-minute histograms inclusively between [12:00 and 23:59] into one 12-hour histogram for each day of the two years resulting in 1,460 histograms to the visualization system instead of 1,051,200 with conventional techniques. This new representation presents a waste of 46% as opposed to a waste of 105000% with conventional techniques.

In one embodiment, the display may understand horizontal resolution and determine how many pixels are available for rendering vertical histograms. This "horizontal viewport size" may be the number of histograms requested (e.g., a number equal to or less than the number of horizontal pixels). The histogram delivery technique may attempt to aggregate the number of bins to a level where the number of histograms returned for the requested time range roughly approximates but is less than the "horizontal viewport size" (e.g., within a factor of 4 to be roughly approximate).

In one embodiment, to determine the number of bins requested, available visual space may be pulled or requested from the display itself through various techniques. In a web browser, for example, the number of horizontal and vertical pixels available in the viewport may be accessible by calling a Javascript routine.

In one embodiment, the number of histograms may be less than the number of horizontal pixels, as any number greater may be lost during visualization. The number of bins desired may be less than the number of vertical pixels, as any number greater may be lost during visualization.

In one embodiment, the number of histograms is roughly half the number of horizontal pixels. For example, with 1000 pixels of horizontal space, roughly 500 histograms may be created. And, with 600 pixels of vertical space, 300 bins may be used.

In one embodiment, fine granularity histograms may be automatically aggregated into successively wider granularity histograms to accelerate visualization of data over arbitrary periods of time (e.g., storing 1 minute, 5 minute, 1 hour, and 12 hour aggregations). For example, each time a one-minute histogram is stored, the containing five-minute histogram is recalculated and stored, causing the containing one-hour histogram to be recalculated and stored, causing the containing 12-hour histogram to be recalculated and stored, etc. Accordingly, histogram data is pre-calculated as data is received. The largest feasible pre-calculated histogram accumulates is selected above. A user may provide the largest feasible pre-calculated histogram based on how often the user believes they would be used. For example, a user may provide the largest feasible pre-calculated histogram based on how long they believe they will retain data and how frequently long time periods will be visualized.

Bin-Realm Efficiency

Another advantage of the techniques described herein is an ability to represent histograms in a smaller information footprint based on the visualization parameters.

Human beings often interpret logarithmically scaled data incorrectly and tend to operate more effectively with linearly scaled data. Given a wide magnitude space and a linear representation, there may be too much data to display (e.g., 45,391 bins. When visualizing data, the resolution at which data may be usefully displayed may be determined. For example, on displays available today, humans cannot distinguish in excess of 1,000 histogram bins without external apparatus. The technique described below provides a method of dynamic rebinning that may optimize the histogram for visual delivery in linearly scaled representation where bins otherwise not visible on-display may be combined into a single bin.

In one embodiment, specific user-supplied minimum and maximum visual limits may be provided. For example the number of pixels and size of a display may impact the visual limits. The greater of the absolute value of the minimum and maximum visual limits is taken as the focal maximum. In one example, there may be 90 bins like [1.0,1.1), [1.1,1.2), . . . [9.9,10) each of which times $10^n$. The logarithmic bin set (e.g., the 90 bins for a particular value of n) containing the focal maximum is preserved (e.g., unchanged, these bins will not be combined with other bins for efficiency). Smaller logarithmic bin sets (e.g., logarithmic bins of $10^x$ (where x<n from the preserved set)) may be preserved until the total number of bins meets or exceeds the available vertical visual space (e.g., with 90 bins in each logarithmic set and if a set and the surrounding sets are preserved, 270 bins may be created) and the smallest logarithmic bin set (e.g., based on the number of vertical pixels available, the smallest bin with a sample in it, or a user-supplied minimum) is taken as the focal minimum. If minimum<=0<=maximum, a special 0 bin is preserved. EXAMPLE: Given a data set: 0.02, 0.04, 1.8, 11, 76, 873, we would represent this in a log-linear histogram as one sample in each of the following buckets: [0.02,0.03), [0.04, 0.05), [1.8,1.9), [11,12), [76,77), and [870,880). The focal maximum of the data set is 880 (the top of the largest bin). A user-supplied maximum may override this, let us assume a user-supplied focal maximum of 100. Assuming a vertical space of 1000 pixels, we can display the bins [11,12) and [76,77) in 10 pixels of vertical space each (bins [10,11) through [99,100) consuming 900 pixels of vertical space total). This leaves 100 pixels for bins less than 10. Bins [1.0,1.1) through [9.9,10), consume one pixel of vertical space each totally 90 pixels. This leave 10 pixels to represent all smaller bins. Accordingly, each of the bins [0.02,0.03) through [0.99,1.0) would be assigned 0.1 pixels which is not possible visualize setting our focal minimum to 1.0. Accordingly, we will combine all bins between [0.2, 1.0), into a single bin containing the sum of all contained samples and display it as a single bin.

Figure 7:
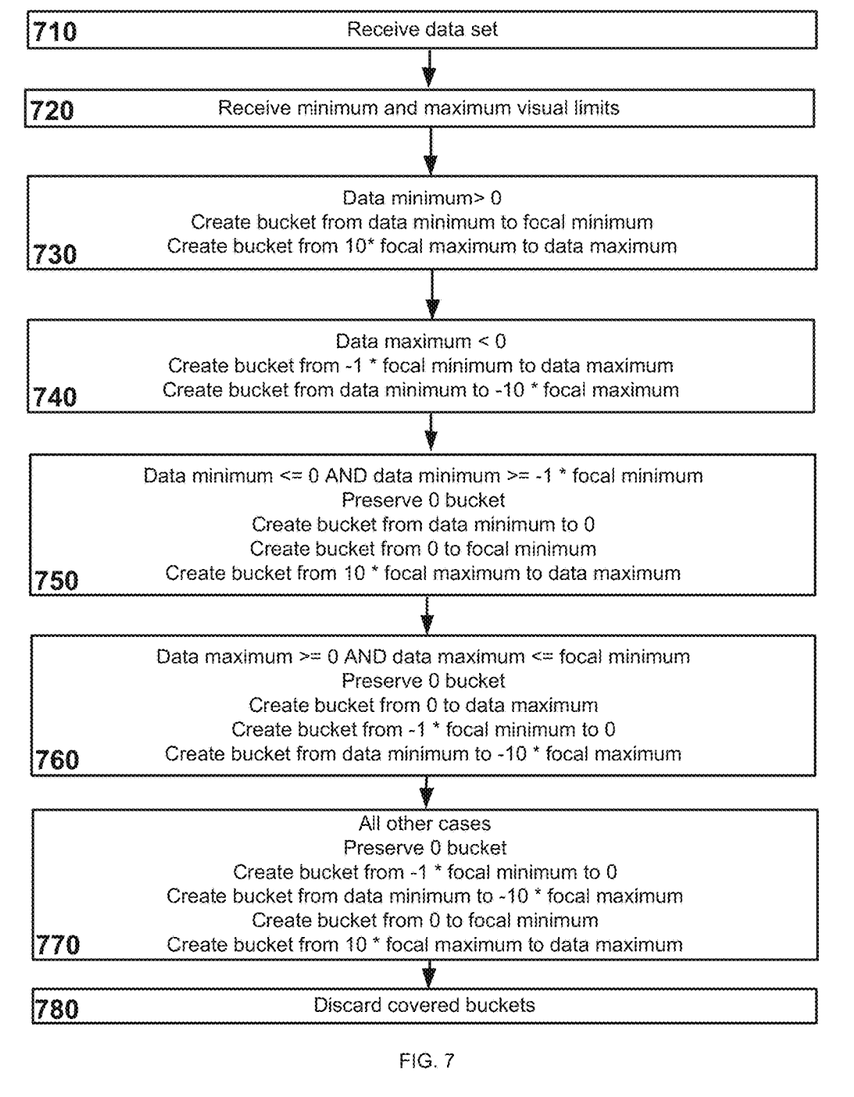
FIG. 7 depicts an example flowchart describing processing performed in an illustrative embodiment of the present invention.

FIG. 7 depicts an example flowchart describing processing performed in an illustrative embodiment of the present invention. In 710, a data set may be received or accessed. From 710, flow may move to 720.

In 720, minimum and maximum visual limits may be received. The focal maximum may be determined from the larger of the absolute value of minimum visual limit or maximum visual limit. From 720, flow may move to 730.

In 730, a determination may be made if data minimum (e.g., the smallest value in a data set) is greater than 0. If so, a new bin may be created using [data minimum, focal minimum) and the covered bins may be discarded as in step 780. A new bin may be created and all data in bins between [data minimum, focal minimum) may be placed in the newly created bin. For example, a new bin may be created using (10*focal maximum, data maximum] and the covered bins may be discarded as in step 780. From 730, flow may move to 740.

In 740, a determination may be made if data maximum is less than 0. If so, a new bin may be created using (−1*focal minimum, data maximum] and the covered bins may be discarded as in step 780, and a new bin may be created using (data minimum, −10*focal maximum] and the covered bins may be discarded as in step 780. From 740, flow may move to 750.

In 750, a determination may be made if data minimum is less than or equal to 0 and data minimum is greater than or equal to −1*focal minimum. If so, (1) the 0 bin is preserved, (2) a new bin may be created using (data minimum, 0) and the covered bins may be discarded as in step 780, (3) a new bin may be created using (0, focal minimum) and the covered bins may be discarded as in step 780, and (4) a new bin may be created using (10*focal maximum, data maximum] and the covered bins may be discarded as in step 780. From 750, flow may move to 760.

In 760, a determination may be made if data maximum is less than or equal to focal minimum and data maximum is greater than or equal 0. If so, (1) the 0 bin is preserved, (2) a new bin may be created using (0, data maximum] and the covered bins may be discarded as in step 780, (3) a new bin may be created using (−1*focal minimum, 0) and the covered bins may be discarded as in step 780, and (4) a new bin may be created using (data minimum, −10*focal maximum] and the covered bins may be discarded as in step 780. From 760, flow may move to 770.

In 770, if none of the determinations of 730, 740, 750, or 760 apply, then (1) the 0 bin is preserved, (2) a new bin may be created using (−1*focal minimum, 0) and the covered bins may be discarded as in step 780, (3) a new bin may be created using (data minimum, −10*focal maximum] and the covered bins may be discarded as in step 780, (4) a new bin may be created using (0, focal minimum) and the covered bins may be discarded as in step 780, and (5) a new bin may be created using (10*focal maximum, data maximum]. From 770, flow may end. Note, each of the determinations of 730, 740, 750, and 760 may be exclusive.

Figure 8:
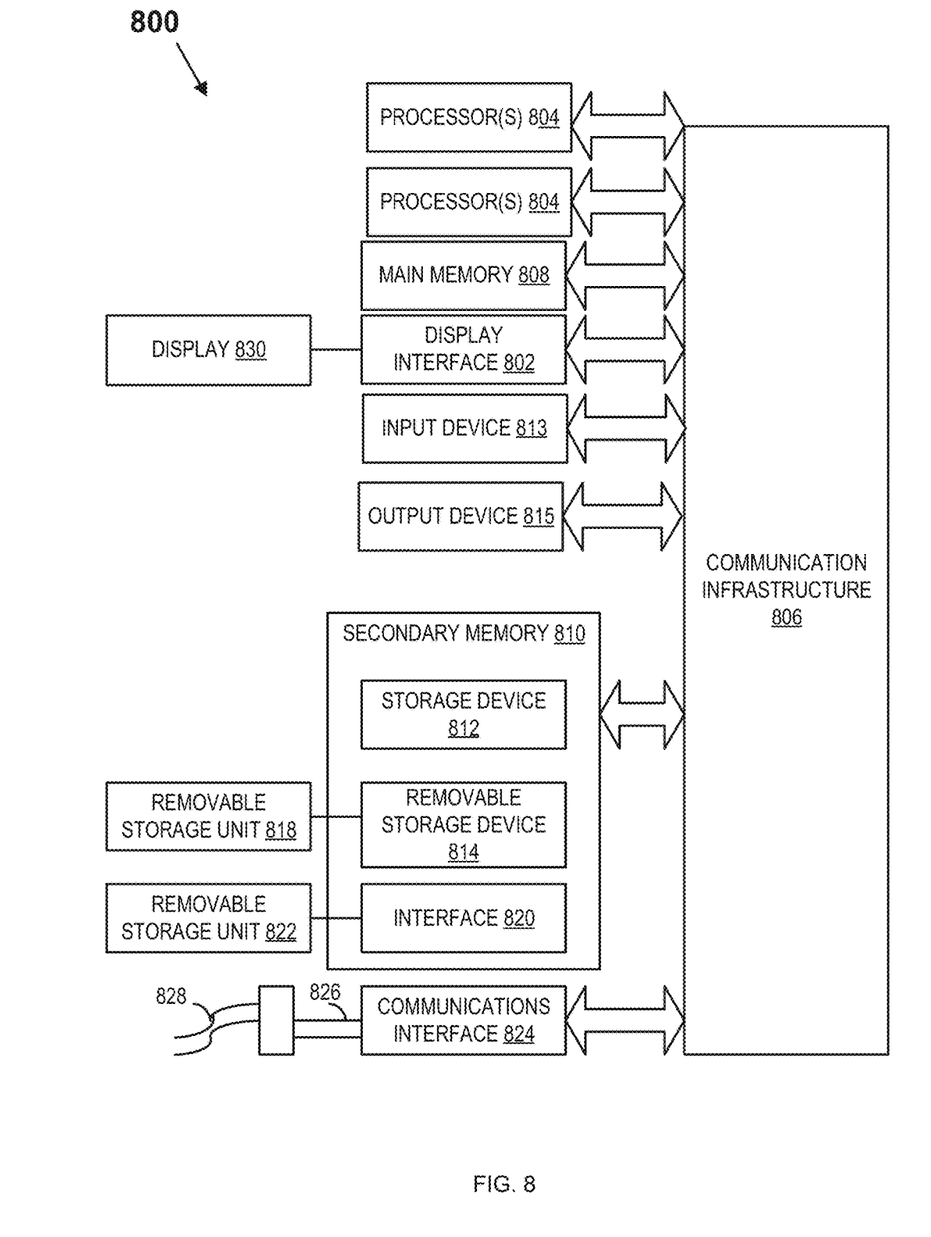
FIG. 8 depicts an example computer processing system that may be used in implementing an embodiment of the present invention.

In one embodiment, the stored histograms may be reevaluated over time for minimum and maximum values. These minimum and maximum values may be used as if they were supplied as described above in 720. For example, if user or viewer selected limits were not received, the minimum and maximum values may be calculated from the dataset itself FIG. 8 depicts an example computer system that may be used in implementing an illustrative embodiment of the present invention. Specifically, FIG. 8 depicts an illustrative embodiment of a computer system 800 that may be used in computing devices such as, e.g., but not limited to, stand-alone, client, server devices, or system controllers. FIG. 8 depicts an illustrative embodiment of a computer system that may be used as client device, a server device, a controller, etc. The present invention (or any part(s) or function(s) thereof) may be implemented using hardware, software, firmware, or a combination thereof and may be implemented in one or more computer systems or other processing systems. In fact, in one illustrative embodiment, the invention may be directed toward one or more computer systems capable of carrying out the functionality described herein. An example of a computer system 800 is shown in FIG. 8, depicting an illustrative embodiment of a block diagram of an illustrative computer system useful for implementing the present invention. Specifically, FIG. 8 illustrates an example computer 800, which in an illustrative embodiment may be, e.g., (but not limited to) a personal computer (PC) system running an operating system such as, e.g., (but not limited to) MICROSOFT® WINDOWS® NT/98/2000/XP/Vista/Windows 7/Windows 8, etc. available from MICROSOFT® Corporation of Redmond, Wash., U.S.A. or an Apple computer executing MAC® OS or iOS from Apple® of Cupertine, Calif., U.S.A. or a smartphone running iOS, Android, or Windows mobile, for example. However, the invention is not limited to these platforms. Instead, the invention may be implemented on any appropriate computer system running any appropriate operating system. In one illustrative embodiment, the present invention may be implemented on a computer system operating as discussed herein. An illustrative computer system, computer 800 is shown in FIG. 8. Other components of the invention, such as, e.g., (but not limited to) a computing device, a communications device, a telephone, a personal digital assistant (PDA), an iPhone, a 3G/4G wireless device, a wireless device, a personal computer (PC), a handheld PC, a laptop computer, a smart phone, a mobile device, a netbook, a handheld device, a portable device, an interactive television device (iTV), a digital video recorder (DVR), client workstations, thin clients, thick clients, fat clients, proxy servers, network communication servers, remote access devices, client computers, server computers, peer-to-peer devices, routers, web servers, data, media, audio, video, telephony or streaming technology servers, etc., may also be implemented using a computer such as that shown in FIG. 8. In an illustrative embodiment, services may be provided on demand using, e.g., an interactive television device (iTV), a video on demand system (VOD), via a digital video recorder (DVR), and/or other on demand viewing system. Computer system 800 may be used to implement the network and components as described above.

The computer system 800 may include one or more processors, such as, e.g., but not limited to, processor(s) 804. The processor(s) 804 may be connected to a communication infrastructure 806 (e.g., but not limited to, a communications bus, cross-over bar, interconnect, or network, etc.). Processor 804 may include any type of processor, microprocessor, or processing logic that may interpret and execute instructions (e.g., for example, a field programmable gate array (FPGA)). Processor 804 may comprise a single device (e.g., for example, a single core) and/or a group of devices (e.g., multi-core). The processor 804 may include logic configured to execute computer-executable instructions configured to implement one or more embodiments. The instructions may reside in main memory 808 or secondary memory 810. Processors 804 may also include multiple independent cores, such as a dual-core processor or a multi-core processor. Processors 804 may also include one or more graphics processing units (GPU) which may be in the form of a dedicated graphics card, an integrated graphics solution, and/or a hybrid graphics solution. Various illustrative software embodiments may be described in terms of this illustrative computer system. After reading this description, it will become apparent to a person skilled in the relevant art(s) how to implement the invention and/or parts of the invention using other computer systems and/or architectures.

Computer system 800 may include a display interface 802 (e.g., the HMI) that may forward, e.g., but not limited to, graphics, text, and other data, etc., from the communication infrastructure 806 (or from a frame buffer, etc., not shown) for display on the display unit 801. The display unit 801 may be, for example, a television, a computer monitor, a touch sensitive display device, or a mobile phone screen. The output may also be provided as sound through a speaker.

The computer system 800 may also include, e.g., but is not limited to, a main memory 808, random access memory (RAM), and a secondary memory 810, etc. Main memory 808, random access memory (RAM), and a secondary memory 810, etc., may be a computer-readable medium that may be configured to store instructions configured to implement one or more embodiments and may comprise a random-access memory (RAM) that may include RAM devices, such as Dynamic RAM (DRAM) devices, flash memory devices, Static RAM (SRAM) devices, etc.

The secondary memory 810 may include, for example, (but is not limited to) a hard disk drive 812 and/or a removable storage drive 814, representing a floppy diskette drive, a magnetic tape drive, an optical disk drive, a compact disk drive CD-ROM, flash memory, etc. The removable storage drive 814 may, e.g., but is not limited to, read from and/or write to a removable storage unit 818 in a well-known manner. Removable storage unit 818, also called a program storage device or a computer program product, may represent, e.g., but is not limited to, a floppy disk, magnetic tape, optical disk, compact disk, etc. which may be read from and written to removable storage drive 814. As will be appreciated, the removable storage unit 818 may include a computer usable storage medium having stored therein computer software and/or data.

In alternative illustrative embodiments, secondary memory 810 may include other similar devices for allowing computer programs or other instructions to be loaded into computer system 800. Such devices may include, for example, a removable storage unit 822 and an interface 820. Examples of such may include a program cartridge and cartridge interface (such as, e.g., but not limited to, those found in video game devices), a removable memory chip (such as, e.g., but not limited to, an erasable programmable read only memory (EPROM), or programmable read only memory (PROM) and associated socket, and other removable storage units 822 and interfaces 820, which may allow software and data to be transferred from the removable storage unit 822 to computer system 800.

Computer 800 may also include an input device 803 which may include any mechanism or combination of mechanisms that may permit information to be input into computer system 800 from, e.g., a user or operator. Input device 803 may include logic configured to receive information for computer system 800 from, e.g. a user or operator. Examples of input device 803 may include, e.g., but not limited to, a mouse, pen-based pointing device, or other pointing device such as a digitizer, a touch sensitive display device, and/or a keyboard or other data entry device (none of which are labeled). Other input devices 803 may include, e.g., but not limited to, a biometric input device, a video source, an audio source, a microphone, a web cam, a video camera, and/or other camera.

Computer 800 may also include output devices 815 which may include any mechanism or combination of mechanisms that may output information from computer system 800. Output device 815 may include logic configured to output information from computer system 800. Embodiments of output device 815 may include, e.g., but not limited to, display 801, and display interface 802, including displays, printers, speakers, cathode ray tubes (CRTs), plasma displays, light-emitting diode (LED) displays, liquid crystal displays (LCDs), printers, vacuum fluorescent displays (VFDs), surface-conduction electron-emitter displays (SEDs), field emission displays (FEDs), etc. Computer 800 may include input/output (I/O) devices such as, e.g., (but not limited to) input device 803, communications interface 824, connection 828 and communications path 826, etc. These devices may include, e.g., but are not limited to, a network interface card, onboard network interface components, and/or modems.

Communications interface 824 may allow software and data to be transferred between computer system 800 and external devices or other computer systems. Computer system 800 may connect to other devices or computer systems via wired or wireless connections. Wireless connections may include, for example, WiFi, satellite, mobile connections using, for example, TCP/IP, 802.15.4, high rate WPAN, low rate WPAN, 6loWPAN, ISA100.11a, 802.11.1, WiFi, 3G, WiMAX, 4G and/or other communication protocols.

In this document, the terms "computer program medium" and "computer readable medium" may be used to generally refer to media such as, e.g., but not limited to, removable storage drive 814, a hard disk installed in hard disk drive 812, flash memories, removable discs, non-removable discs, etc. In addition, it should be noted that various electromagnetic radiation, such as wireless communication, electrical communication carried over an electrically conductive wire (e.g., but not limited to twisted pair, CAT5, etc.) or an optical medium (e.g., but not limited to, optical fiber) and the like may be encoded to carry computer-executable instructions and/or computer data that embodiments of the invention on e.g., a communication network. These computer program products may provide software to computer system 800. It should be noted that a computer-readable medium that comprises computer-executable instructions for execution in a processor may be configured to store various embodiments of the present invention. References to "one embodiment," "an embodiment," "example embodiment," "various embodiments," etc., may indicate that the embodiment(s) of the invention so described may include a particular feature, structure, or characteristic, but not every embodiment necessarily includes the particular feature, structure, or characteristic.

Further, repeated use of the phrase "in one embodiment," or "in an illustrative embodiment," do not necessarily refer to the same embodiment, although they may. The various embodiments described herein may be combined and/or features of the embodiments may be combined to form new embodiments.

Unless specifically stated otherwise, as apparent from the following discussions, it is appreciated that throughout the specification discussions utilizing terms such as "processing," "computing," "calculating, " "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

In a similar manner, the term "processor" may refer to any device or portion of a device that processes electronic data from registers and/or memory to transform that electronic data into other electronic data that may be stored in registers and/or memory. A "computing platform" may comprise one or more processors.

Embodiments of the present invention may include apparatuses for performing the operations herein. An apparatus may be specially constructed for the desired purposes, or it may comprise a general purpose device selectively activated or reconfigured by a program stored in the device.

Embodiments may be embodied in many different ways as a software component. For example, it may be a stand-alone software package, or it may be a software package incorporated as a "tool" in a larger software product, such as, for example, a scientific modeling product. It may be downloadable from a network, for example, a website, as a stand-alone product or as an add-in package for installation in an existing software application. It may also be available as a client-server software application, or as a web-enabled software application. It may also be part of a system for efficient manipulation and display of histograms. Computer system 800 may be used to create a general purpose computer. A general purpose computer may be specialized by storing programming logic that enables one or more processors to perform the techniques indicated herein and one or more of the steps of FIG. 6. Computer system 800 or multiple embodiments of computer system 800 may be used to perform the functions described above.

Embodiments of the present invention may include apparatuses for performing the operations herein. An apparatus may be specially constructed for the desired purposes, or it may comprise a general purpose device selectively activated or reconfigured by a program stored in the device.

Embodiments of the present invention may improve the functioning of computer system 800. For example, embodiments of the present invention processing speed for creating and manipulating histograms.

Embodiments may be embodied in many different ways as a software component. For example, it may be a stand-alone software package, or it may be a software package incorporated as a "tool" in a larger software product. It may be downloadable from a network, for example, a website, as a stand-alone product or as an add-in package for installation in an existing software application. It may also be available as a client-server software application, or as a web-enabled software application.

While various embodiments of the present invention have been described above, it should be understood that they have been presented by way of example only, and not limitation. Thus, the breadth and scope of the present invention should not be limited by any of the above-described illustrative embodiments, but should instead be defined only in accordance with the following claims and their equivalents. The embodiments of the present invention that have been described above may contain features that may be removed or combined between the described embodiments to derive additional embodiments.

What is claimed is:

1. A method for constructing histograms, comprising:
receiving, by one or more processors, a first set of data values, wherein the first set of data values include a first type of measurement for a first time interval;
creating, by the one or more processors, a first set of bins in memory to represent the first set of data values,
wherein creating the first set of bins comprises assigning a first bin to represent any data value of zero in the first set of data values, and assigning to each of the remaining bins in the first set of bins a respective range spanning two different numbers, such that the first bin represents the number zero, and the remaining bins represent non-zero numbers;
generating, by the one or more processors, a first histogram using the first set of bins and the first set of data values, wherein the first histogram provides an indication, for each bin of the first set of bins, how many data values of the first set of data values are represented by the bin, wherein the first histogram is for the first time interval;
receiving, by the one or more processors, a second set of data values, wherein the second set of data values include the first type of measurement for a second time interval;
generating, by the one or more processors, a second histogram using the first set of bins and the second set of data values, such that the first histogram and the second histogram have a uniform bin scheme by using the same set of bins, wherein the second histogram provides an indication, for each bin of the first set of bins, how many data values of the second set of data values are represented by the bin, wherein the second histogram is for the second time interval;
generating a third histogram for a third time interval that covers the first time interval and the second time interval, wherein the third histogram is generated by using the first set of bins, and by adding the first histogram and the second histogram on a bin-by-bin basis, wherein the third histogram indicates, for each bin of the first set of bins, how many data values of the first set of data values and the second set of data values are represented by the bin;
receiving a minimum visual limit for displaying the third histogram, the minimum visual limit being greater than a minimum value of the data values of the third histogram;
modifying the third histogram by combining, into a single bin, all bins of the first set of bins that are covered by a range between the minimum value and the minimum visual limit, and further by discarding all bins of the first set of bins that are covered by the range, wherein the single bin has a data value that is a sum of the respective data values of the combined bins; and
displaying the modified third histogram on a display device.

2. The method of claim 1, wherein: the first time interval or second time interval is a 1 minute, 5 minutes, 1 hour, and 12 hour time increment.

3. The method of claim 2, wherein
data values are received each minute; and
each minute, a one-minute histogram is created, a five minute histogram is recalculated, a one-hour histogram is recalculated, and a twelve-hour histogram is recalculated.

4. The method of claim 1, wherein each bin in the first set of bins has a bin size based on the respective range assigned to the bin.

5. The method of claim 1, wherein the first bin contains, in addition to the number 0, non-zero numbers too small to otherwise be accounted for.

6. The method of claim 1, wherein the respective ranges of the remaining bins of the first set of bins are represented by the same number of bits.

7. The method of claim 1, wherein the first set of bins, other than the first bin thereof, collectively represent a range from $1.0 \times 10^{-127}$ to $9.9 \times 10^{128}$.

8. The method of claim 1, wherein:
the first set of bins, other than the first bin thereof, is a set of log-linear bins, which include at least a first subset of bins and a second subset of bins,
all bins of the first subset of bins represent respective portions of a first range of numbers, and all have a first size,
all bins of the second subset of bins represent respective portions of a second range of numbers adjacent to the first range, and all have a second size that is ten times greater than the first size,
the second range has a size that ten times greater than a size of the first range, such that the first range and the second range are represented by the same number of bins.

9. The method of claim 8, wherein a number of pixels of the display device assigned to display each of the second subset of bins is ten times a number of pixels of the display device assigned to display each of the first subset of bins.

10. The method of claim 1, wherein the first set of data values and the second set of data values are two-dimensional or three-dimensional data values, the method further comprising displaying the first histogram, the second histogram, or the third histogram by using color to display one dimension of the two-dimensional or three-dimensional data values.

11. A non-transitory computer-readable medium comprising instructions, which when executed by one or more processors causes the one or more processors to perform operations for constructing histograms, the computer-readable medium comprising instructions to:
receive a first set of data values, wherein the first set of data values include a first type of measurement for a first time interval;
create a first set of bins in memory to represent the first set of data values,
wherein the instructions cause the first set of bins to be created by assigning a first bin to represent any data value of zero in the first set of data values, and assigning to each of the remaining bins in the first set of bins a respective range spanning two different numbers, such that the first bin represents the number zero, and the remaining bins represent non-zero numbers;
generate a first histogram using the first set of bins and the first set of data values, wherein the first histogram provides an indication, for each bin of the first set of bins, how many data values of the first set of data values are represented by the bin, wherein the first histogram is for the first time interval;
receive a second set of data values, wherein the second set of data values include the first type of measurement for a second time interval;
generate, by the one or more processors, a second histogram using the first set of bins and the second set of data values, such that the first histogram and the second histogram have a uniform bin scheme by using the same set of bins, wherein the second histogram provides an indication, for each bin of the first set of bins, how many data values of the second set of data values are represented by the bin, and wherein the second histogram is for the second time interval;
generate a third histogram for a third time interval that covers the first time interval and the second time interval, wherein the third histogram is generated by using the first set of bins, and by adding the first histogram and the second histogram on a bin-by-bin basis, wherein the third histogram indicates, for each bin of the first set of bins, how many data values of the first set of data values and the second set of data values are represented by the bin,
receive a minimum visual limit for displaying the third histogram, the minimum visual limit being greater than a minimum value of the data values of the third histogram;
modify the third histogram by combining, into a single bin, all bins of the first set of bins that are covered by a range between the minimum value and the minimum visual limit, and further by discarding all bins of the first set of bins that are covered by the range, wherein the single bin has a data value that is a sum of the respective data values of the combined bins; and
display the modified third histogram on a display device.

12. The non-transitory computer-readable medium of claim 11, wherein: the first time interval or second time interval is a 1 minute, 5 minutes, 1 hour, and 12 hour time interval.

13. The non-transitory computer-readable medium of claim 12,
wherein
data values are received each minute; and
each minute, a one-minute histogram is created, a five-minute histogram is recalculated, a one-hour histogram is recalculated, and a twelve-hour histogram is recalculated.

14. A system for constructing histograms comprising:
one or more processors for executing a plurality of instructions;
a display device in communication with the one or more processors; and
a storage device in communication with the one or more processors, the storage device holding the plurality of instructions, the plurality of instructions including instructions to:
receive a first set of data values, wherein the first set of data values include a first type of measurement for a first time interval;
create a first set of bins in memory to represent the first set of data values by assigning a first bin to represent any data value of zero in the first set of data values, and assigning to each of the remaining bins in the first set of bins a respective range spanning two different numbers, such that the first bin represents the number zero, and the remaining bins represent non-zero numbers;
generate a first histogram using the first set of bins and the first set of data values, wherein the first histogram provides an indication, for each bin of the first set of bins, how many data values of the first set of data values are represented by the bin, wherein the first histogram is for the first time interval;

receive a second set of data values, wherein the second set of data values include the first type of measurement for a second time interval;

generate a second histogram using the first set of bins and the second set of data values, such that the first histogram and the second histogram have a uniform bin scheme by using the same set of bins, wherein the second histogram provides an indication, for each bin of the first set of bins, how many data values of the second set of data values are represented by the bin, and wherein the second histogram is for the second time interval;

generate a third histogram for a third time interval that covers the first time interval and the second time interval, wherein the third histogram is generated by using the first set of bins, and by adding the first histogram and the second histogram on a bin-by-bin basis, wherein the third histogram indicates, for each bin of the first set of bins, how many data values of the first set of data values and the second set of data values are represented by the bin;

receive a minimum visual limit for displaying the third histogram, the minimum visual limit being greater than a minimum value of the data values of the third histogram;

modify the third histogram by combining, into a single bin, all bins of the first set of bins that are covered by a range between the minimum value and the minimum visual limit, and further by discarding all bins of the first set of bins that are covered by the range, wherein the single bin has a data value that is a sum of the respective data values of the combined bins; and display the modified third histogram on the display device.

15. The system of claim 14, wherein:
the first time interval or second time interval is a 1 minute, 5 minutes, 1 hour, and 12 hour time increment.

16. The system of claim 15, wherein
data values are received each minute; and
each minute, a one-minute histogram is created, a five-minute histogram is recalculated, a one-hour histogram is recalculated, and a twelve-hour histogram is recalculated.

\* \* \* \* \*